United States Patent
Kashiwaba

(10) Patent No.: US 8,767,323 B2
(45) Date of Patent: Jul. 1, 2014

(54) OPTICAL APPARATUS

(75) Inventor: Seiichi Kashiwaba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/427,555

(22) Filed: Mar. 22, 2012

(65) Prior Publication Data
US 2012/0257294 A1 Oct. 11, 2012

(30) Foreign Application Priority Data

Apr. 8, 2011 (JP) ................. 2011-086170

(51) Int. Cl.
*G02B 7/02* (2006.01)
(52) U.S. Cl.
CPC ..................... *G02B 7/022* (2013.01)
USPC .......................... 359/826; 359/823
(58) Field of Classification Search
CPC ......... G02N 7/02; G02N 7/021; G02N 7/022; G02N 7/026
USPC ......... 359/811, 819, 823, 826, 700, 701, 703, 359/704, 694, 699, 813
See application file for complete search history.

(56) References Cited

U.S. PATENT DOCUMENTS

| 6,768,599 B2 * | 7/2004 | Takanashi et al. ............ 359/819 |
| 2007/0195430 A1 * | 8/2007 | Koyama ....................... 359/703 |

FOREIGN PATENT DOCUMENTS

JP      2006-91153 A      4/2006

* cited by examiner

*Primary Examiner* — Darryl J Collins
*Assistant Examiner* — Gary O'Neill
(74) *Attorney, Agent, or Firm* — Canon USA Inc IP Division

(57) ABSTRACT

A rotation of a first eccentric member adjusts a parallel eccentricity of an optical element held by a holding member, rotation of a second eccentric member adjusts a tilt eccentricity of the optical element held by a holding member, and change of a position of an engaging member and a position where the second eccentric member is engaged with a second groove portion adjusts a position of the optical element in the direction of an optical axis.

12 Claims, 5 Drawing Sheets

OPTICAL APPARATUS

BACKGROUND OF THE INVENTION

1. Field of the Invention

The present disclosure relates to an optical apparatus such as a lens barrel including an element holding member for holding an optical element and, more specifically, to an optical apparatus for adjusting the displacement of the element holding member.

2. Description of the Related Art

Japanese Patent Application Laid-Open No. 2006-91153 discusses an optical element holding mechanism including a first holding barrel, an eccentric ring provided with cam grooves having amount of lift in the direction of an optical axis, a second holding barrel for holding an optical element, and an eccentric roller inserted into the cam grooves of the eccentric ring and attached to the second holding barrel. The above configuration allows the adjustment each of a parallel eccentricity of the optical element by decentering the eccentric ring itself, a tilt eccentricity of the optical element by rotating the eccentric roller, and a position of the optical axis direction by rotating the second holding barrel.

In the configuration discussed by Japanese Patent Application Laid-Open No. 2006-91153, however, the second holding barrel (the optical element) is rotated when the optical axis direction is adjusted to change the tilt direction of the optical element. On the other hand, also when the tilt eccentricity of the optical element is adjusted, the position of the optical axis direction is changed by the eccentric roller. This requires repetitive adjustment to satisfy both of adjustment of a desired position of the optical axis direction and adjustment of a desired tilt eccentricity.

Furthermore, if a high adjustment resolution is required of an optical apparatus, it is difficult to accurately adjust the parallel eccentricity of the optical element because the eccentric ring is directly moved.

SUMMARY OF THE INVENTION

According to an aspect of the present invention, an optical apparatus includes a first supporting member including a first groove portion extending in a direction of an optical axis, a second supporting member including a second groove portion extending in a direction inclined toward the direction of the optical axis and a third groove portion extending in a direction orthogonal to the optical axis, a holding member configured to hold an optical element, a first eccentric member having one end being rotatably attached to the holding member with a rotational axis in the direction orthogonal to the optical axis as a center and an other end being decentered with respect to the rotational axis and engaged with the first groove portion, a second eccentric member having one end being rotatably attached to the holding member with a rotational axis in the direction orthogonal to the optical axis as a center and an other end being decentered with respect to the rotational axis and engaged with the third groove portion, and an engaging member provided on the first supporting member and engaged with the second groove portion, in which the first eccentric member is rotated with the rotational axis as a center so the optical element moves in the direction orthogonal to the optical axis relative to the first supporting member, the second eccentric member is rotated with the rotational axis as a center so the optical element tilts with respect to the plane orthogonal to the optical axis, and a position where the engaging member is engaged with the second groove portion is changed so the second supporting member moves in the direction of the optical axis relative to the first supporting member.

According to another aspect of the present disclosure, an optical apparatus includes a first supporting member including a first groove portion extending in a direction of an optical axis, a second supporting member including a second groove portion extending in a direction inclined toward the direction of the optical axis, a holding member configured to hold an optical element, a first eccentric member having one end being is rotatably attached to the holding member with a rotational axis in the direction orthogonal to the optical axis as a center and an other end being decentered with respect to the rotational axis and engaged with the first groove portion, a second eccentric member having one end being rotatably attached to the holding member with a rotational axis in the direction orthogonal to the optical axis as a center and an other end being decentered with respect to the rotational axis and engaged with the second groove portion, and a regulating member provided on the first supporting member and engaging with a bayonet groove portion provided in the second supporting member to regulate the movement of the second supporting member in the direction of the optical axis relative to the first supporting member, wherein the first eccentric member is rotated with the rotational axis as a center so the optical element moves in the direction orthogonal to the optical axis relative to the first supporting member, the second eccentric member is rotated with the rotational axis as a center so the optical element tilts with respect to the plane orthogonal to the optical axis, and a position where the second eccentric member is engaged with the second groove portion is changed so the holding member moves in the direction of the optical axis relative to the first supporting member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
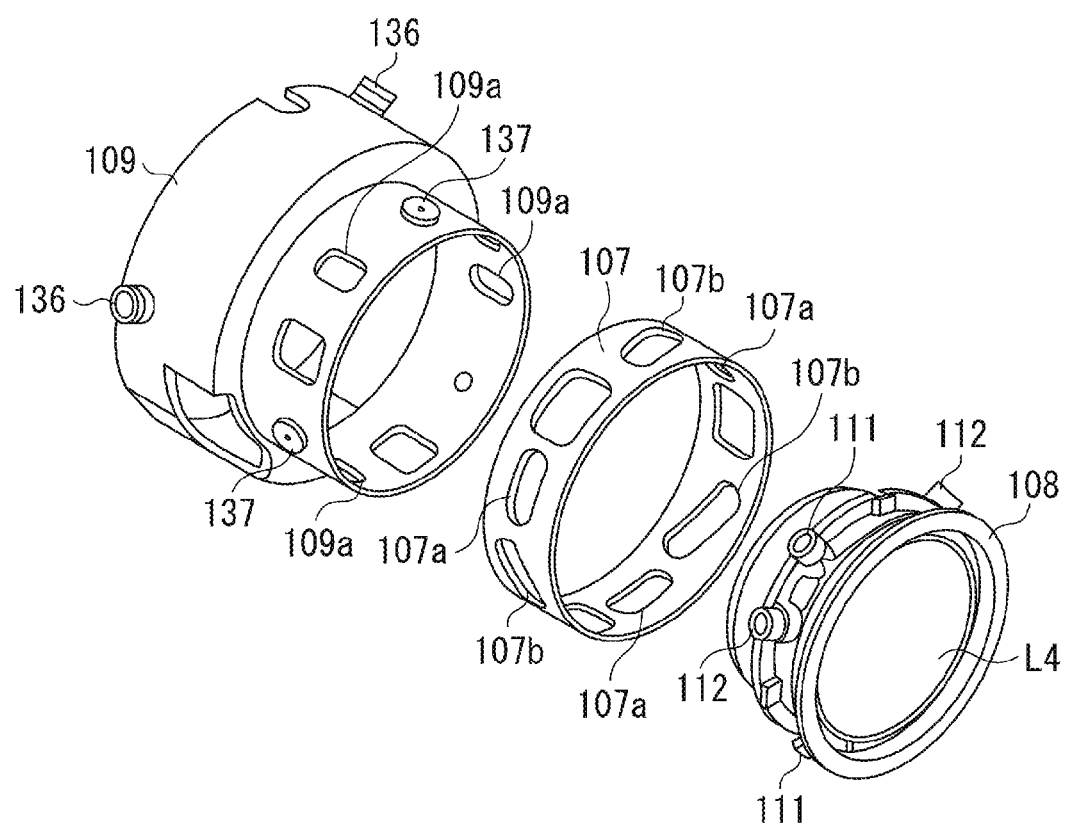
FIG. 1 is an exploded perspective view of a holding portion of an optical element according to a first exemplary embodiment of the present invention.
Figure 2:
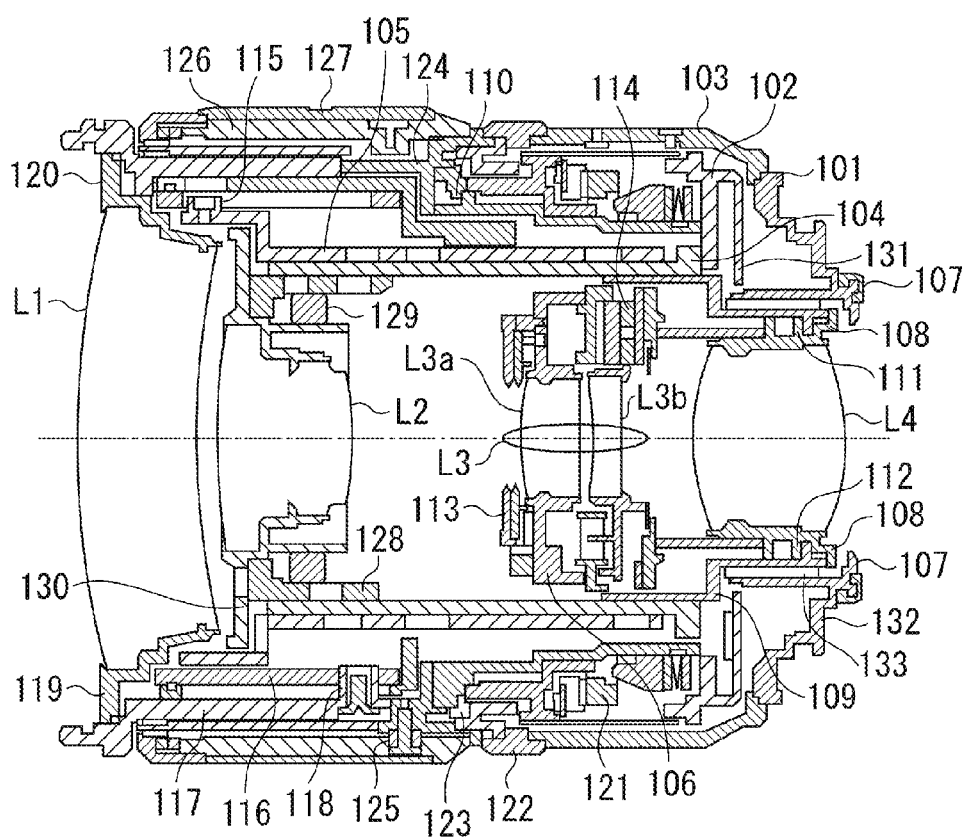
FIG. 2 is a cross section of an interchangeable lens for a single-lens reflex camera according to an exemplary embodiment of the present invention.

An interchangeable lens being an optical apparatus according to a first exemplary embodiment of the present invention is described below with reference to FIGS. 1 and 2. A general configuration of the interchangeable lens including first to fourth groups is described. The interchangeable lens is a four lens-groups structure interchangeable lens with first to fourth lens groups L1 to L4 in order from the object side. All the lens groups L1 to L4 are moved in the direction of the optical axis in a zoom operation. The second lens group L2 is moved in the direction of the optical axis also in a focus operation. The third lens group L3 positioned on the side of the imaging plane is divided into two portion groups of a 3a lens group L3a and a 3b lens group L3b. The 3b lens group L3b is moved not only in the direction of the optical axis but also in the direction orthogonal to the optical axis to correct image shake caused by camera shake.

A mount 101 which has a bayonet for attaching the interchangeable lens to a camera body is screwed to a stationary tube 102. An outer ring 103 is sandwiched and fixed between the mount 101 and the stationary tube 102. The stationary tube 102 is screwed to the guide tube 104 to form a fixing portion with respect to the camera body. A first cam tube 105 which can advances and retreats while rotating around the optical axis by a roller (not illustrated) is fit to the periphery of the guide tube 104.

The rotation of the first cam tube 105 moves the intersection between a guide groove in the direction of the optical axis provided on the guide tube 104 and a cam groove provided on the first cam tube 105. A third-group holding frame 106 for holding the third lens group L3 can be moved in the direction of the optical axis according to the move of the intersection via a screwed roller (not illustrated).

Similarly, a fourth-group movement tube 109 to which a fourth-group holding frame 108 for holding the fourth lens group L4 is fixed and a first rectilinear motion tube 110 can be moved in the direction of the optical axis via a roller 136 and a roller (not illustrated) which are screwed thereto respectively. The structure of holding the fourth lens group L4 is described in detail later. An electromagnetic diaphragm unit 113 composed of a diaphragm driving unit and a diaphragm blade unit is screwed to the third-group holding frame 106. A vibration correction unit 114 is held at a trailing edge via a roller (not illustrated).

The vibration correction unit 114 holds the 3b lens group L3b so that the 3b lens group L3b can be driven in the direction orthogonal to the optical axis and drives the 3b lens group L3b by a driving unit composed of a magnet and a coil. A second cam tube 116 is fitted to the inner periphery of the first rectilinear motion tube 110 in a state where a position in the optical direction is regulated with respect to the first rectilinear motion tube 110 by a known bayonet structure and rotatable. A roller 115 screwed to the first cam tube 105 is engaged with a rotation transmission groove extending in the direction of the optical axis and provided on the second cam tube 116, so that the rotation of the first cam tube 105 is transmitted to the second cam tube 116.

The first rectilinear motion tube 110 is provided with a guide groove extending in the direction of the optical axis and the second cam tube 116 is provided with a cam groove. Thereby, the rotation of the second cam tube 116 moves the intersection between the rectilinear motion groove of the first rectilinear motion tube 110 and the second cam tube 116. As the intersection is moved, a second rectilinear motion tube 117 can be moved in the direction of the optical axis via a screwed roller 118.

A first holding frame 119 for holding the first lens group L1 is fixed around the leading edge of the second rectilinear motion tube 117. An abutment portion between the second rectilinear motion tube 117 and the first holding frame 119 is formed in a slope shape extending in the circumferential direction. For this reason, the first holding frame 119 is fixed to the second rectilinear motion tube 117 while being rotated to enable changing the position in the direction of the optical axis where the first holding frame 119 is fixed to the second rectilinear motion tube 117, which allows correction of shift in the focal position between the wide angle side and telephoto side due to a manufacturing error. The outer periphery of the leading edge of the second rectilinear motion tube 117 is provided with a bayonet portion and the inner periphery thereof is provided with a screw portion. Accessories such as a hood and filter can be attached to each portion.

On the front face of a decorative ring 120 is printed an indication such as a lens name. A focus unit 121 is fixed to the guide tube 104 and composed of a vibratory motor in a circular ring shape rotating mainly around the optical axis and a differential mechanism. The focus unit 121 performs output according to the amount of rotation of rotor of the vibratory motor and the amount of rotation of a manual ring 122. A coupling ring 123 is fixed to the object side of the focus unit 121. An encoder flexible substrate 124 on which a gray code pattern is formed is attached to the outer periphery of a protrusion extending in an arc shape.

A protrusion is provided on a phase on which the encoder flexible substrate 124 is not provided. To the protrusion is screwed a roller 125. The roller 125 is engaged with a groove provided in a zoom operation ring 126 in the peripheral direction to allow the zoom operation ring 126 to be only rotated around the optical axis with the zoom operation ring 126 inhibited from being moved in the direction of the optical axis. A vertical groove with which a zoom key (not illustrated) screwed to the first cam tube 105 is engaged is formed in the zoom operation ring 126. The rotation of the zoom operation ring 126 is transmitted to the first cam tube 105 via the zoom key.

A zoom rubber 127 is wound around the outer periphery of the zoom operation ring 126. A cylinder portion of a focus cam tube 128 is provided with a cam groove. A roller (not illustrated) fixed to the outer periphery of a roller coupling ring 129 and inserted into a hole provided in the first cam tube 105 in a press-fitted state is engaged with the cam groove. A key portion extended from the focus cam tube 128 is engaged with the output portion of the focus unit 121 to integrally rotate therewith. A second holding frame 130 for holding the second lens group L2 is fixed to the focus cam tube 128. When the first cam tube 105 rotates, the second holding frame 130 advances and retreats in the direction of the optical axis.

The amount that the second holding frame 130 is moved forward or backward is determined by the total amount of the amount that the first cam tube 105 itself advances and retreats in the direction of optical axis and the amount that the point where the roller inserted into the hole of the first cam tube 105 is engaged with the cam groove of the focus cam tube 128 is changed in the direction of the optical axis. The second holding frame 130 advances and retreats, while integrally being rotated by the output of the focus unit 121, according to the amount that the point where the roller inserted into the hole of the first cam tube 105 is engaged with the cam groove of the focus cam tube 128 is changed in the direction of the optical axis. Thus, in the interchangeable lens of the present exemplary embodiment, a focal position deviation associated with change in focal length in an inner focus is mechanistically compensated to allow the second lens group L2 to advance and retreat. A main substrate 131 is electrically connected with the electromagnetic diaphragm unit 113 and the vibration correction unit 114 via a flexible substrate to perform various types of controls. The main substrate 131 communicates with the camera body and supplies a power source via a contact block (not illustrated) screwed to the mount 101 and connected with the main substrate 131 via the flexible substrate. A rear lid 132 is elastically coupled with the mount 101 to block harmful light. A protective rubber ring 133 is elastically coupled with the rear lid 132.

In the interchangeable lens thus configured, the rotation of the zoom operation ring 126 rotates the first cam tube 105 via the zoom key and all the lens groups L1 to L4 advance and retreat according to the above mechanism to perform zooming. In autofocus mode and manual focus mode, the focus cam tube 128 is rotated via the differential mechanism in the focus unit 121 by driving the vibratory motor in the focus unit 121 and by rotating the manual ring 122 respectively. Thus, the second lens group L2 advances and retreats according to the above mechanism to allow focusing.

The adjustment of the fourth lens group is described below.

1) Adjustment Groove

A detailed structure is described below related to hold and adjustment of the fourth lens group L4 which is the feature of the present invention. As illustrated in FIG. 1, a guide groove 109a (a first groove portion) extending in the direction of the optical axis and having two first-faces whose longitudinal direction is parallel to the optical axis is provided in three places at the fourth-group movement tube 109 (a first supporting member) at an equal angle interval with the optical axis as a center. A fourth-group adjustment tube (a second supporting member) 107 fitted to the outer periphery of the fourth-group movement tube 109 includes a periphery groove 107a (a third groove portion) provided with two second-faces which extend in the direction orthogonal to the optical axis and whose longitudinal direction is orthogonal to the optical axis. A lead groove 107b with two faces (tiled in an oblique direction with respect to the optical axis) provided with the amount of lift in the direction of the optical axis is provided in three places at the fourth-group adjustment tube 107 at an equal angle interval with the optical axis as a center.

A roller 137 (an engagement member) screwed to the fourth-group movement tube 109 is engaged with the lead groove 107b in a press-fitted state. The fourth-group adjustment tube 107 can advance and retreat in the direction of the optical axis while rotating relative to the fourth-group movement tube 109. The roller 137 is formed of a comparatively high elastic resin material such as polyacetal (POM).

2) Eccentric Roller

A first eccentric roller 111 (a first eccentric member) and a second eccentric roller 112 (a second eccentric member) which are formed of a comparatively high elastic resin material such as POM are screwed in three places to the fourth-group holding frame 108 for holding the fourth lens group L4 at an equal angle interval with the optical axis as a center. The first and second eccentric rollers 111 and 112 each includes a cylindrical portion A with an axis extending radially in the direction orthogonal to the optical axis as a center with the optical axis as a center and a cylindrical portion B with an axis decentered from the center axis of the cylindrical portion A as a center.

The cylindrical portion A of the first eccentric roller 111 is engaged with a roller seat (not illustrated) of the fourth-group holding frame 108 in a press-fitted state and the cylindrical portion B thereof is engaged with the guide groove 109a of the fourth-group movement tube 109 in a press-fitted state. More specifically, the cylindrical portion A on one end is rotatably attached to the fourth-group holding frame 108 with a rotational axis orthogonal to the optical axis as a center and the peripheral face decentered with respect to the rotational axis of the cylindrical portion B on the other end is sandwiched between two first-faces (L1a and L2a in FIG. 4) of the guide groove 109a.

The first eccentric roller 111 can be rotated relative to the fourth-group holding frame 108 with the center axis of the cylindrical portion A as a center. Thereby, as described later, the position of the fourth-group holding frame 108 in the plane orthogonal to the optical axis is adjusted with respect to the fourth-group movement tube 109 by combinations of rotation states of the first eccentric rollers 111 in three places.

The cylindrical portion A of the second eccentric roller 112 is engaged with a roller seat (not illustrated) of the fourth-group holding frame 108 in a press-fitted state and the cylindrical portion B thereof is engaged with the periphery groove 107a of the fourth-group adjustment tube 107 in a press-fitted state. More specifically, the cylindrical portion A on one end is rotatably attached to the fourth-group holding frame 108 with a rotational axis orthogonal to the optical axis as a center and the peripheral face decentered with respect to the rotational axis of the cylindrical portion B on the other end is sandwiched between two first-faces (extending to the direction orthogonal to the optical axis) of the peripheral groove 107a.

The second eccentric roller 112 can be rotated relative to the fourth-group holding frame 108 with the center axis of the cylindrical portion A as a center. Thereby, as described later, the tilt state of the fourth-group holding frame 108 toward the fourth-group adjustment tube 107 is adjusted by combinations of rotation states of the second eccentric rollers 112 in three places. The following describes a work for adjusting the tilt position and the eccentric position of the fourth-group holding frame 108 by the combination of the first and second eccentric rollers 111 and 112.

3) Adjustment of Parallel Eccentricity

Figure 4:
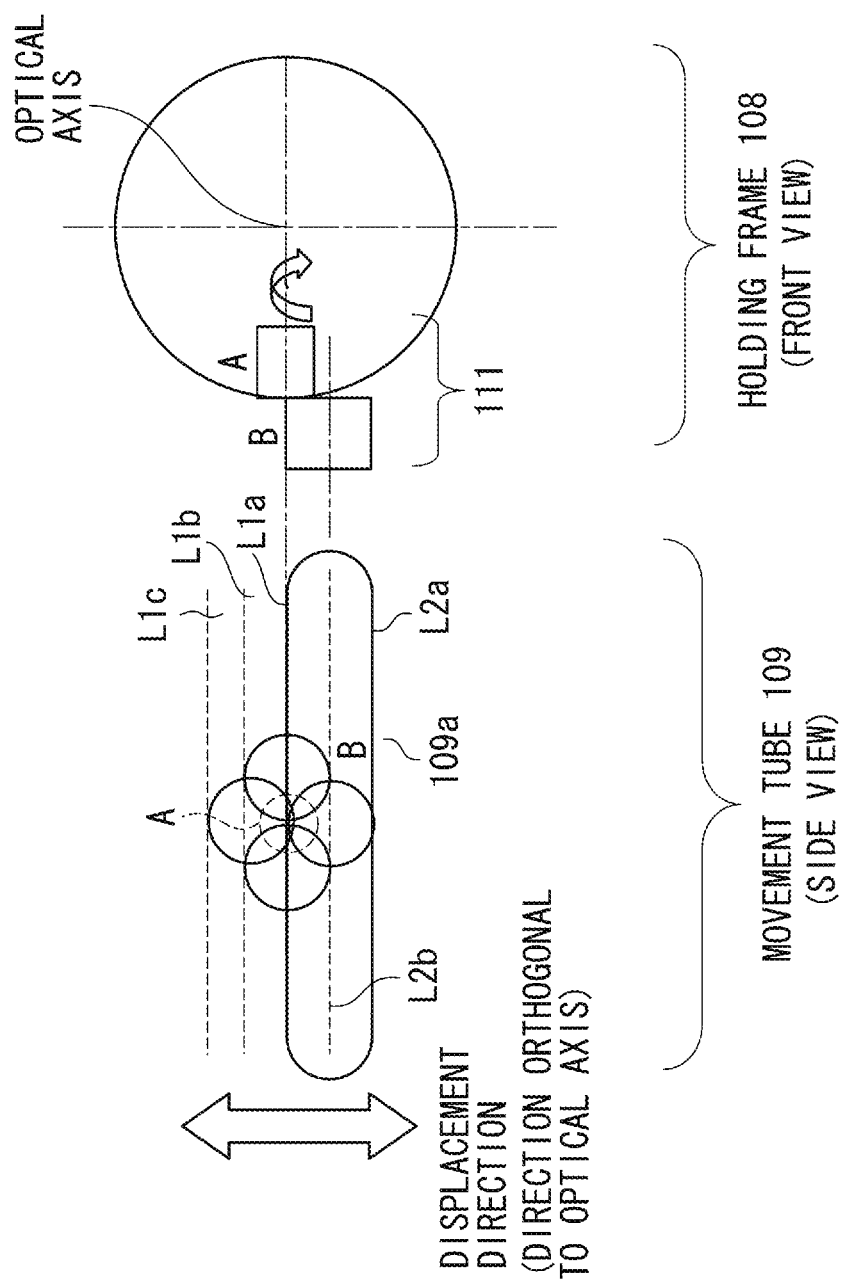
FIG. 4 is a schematic diagram describing displacement in a case where the rotation of an eccentric adjustment roller allows a movable tube to be displaced in the direction orthogonal to the optical axis.
Figure 5:
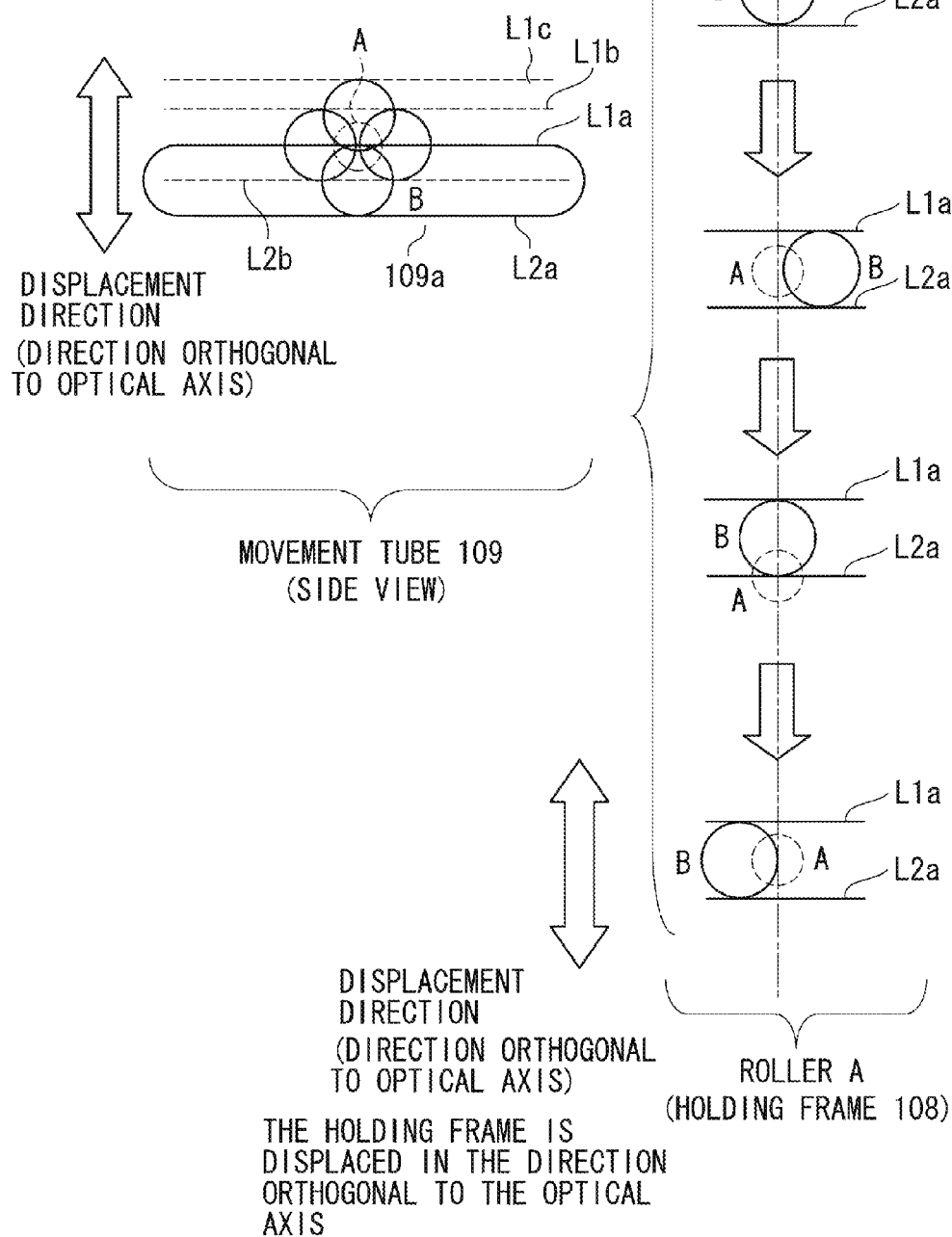
FIG. 5 is a schematic diagram describing displacement in a case where the rotation of an eccentric adjustment roller allows the movable tube not to be displaced in the direction orthogonal to the optical axis but a holding frame to be displaced in the direction orthogonal to the optical axis.

FIG. 4 illustrates displacement in a case where the rotation of the first eccentric roller 111 allows the fourth-group movement tube 109 to be displaced in the direction orthogonal to the optical axis. FIG. 5 illustrates that the rotation of the first eccentric roller 111 allows the fourth-group movement tube 109 not to be displaced in the direction orthogonal to the optical axis but the fourth-group holding frame 108 to be displaced in the direction orthogonal to the optical axis. The rotation position of the fourth-group adjustment tube 107 relative to the fourth-group movement tube 109 is provisionally fixed. In this state, the rotation of the first eccentric roller 111 rotates the cylindrical portion B in the guide groove 109a of the fourth-group movement tube 109 (the cylindrical portion B revolves around the cylindrical portion A) as illustrated in FIG. 4, displacing the movement tube 109 in the direction orthogonal to the optical axis.

Actually, however, at the time of adjusting parallel eccentricity, the movement tube 109 is constrained from being displacing in the direction orthogonal to the optical axis (because the roller 136 is constrained at the intersection between the guide groove of the guide tube 104 in the direction of the optical axis and the cam groove of the first cam tube 105), so that the movement tube 109 is not displaced in the direction orthogonal to the optical axis. As illustrated in the right side of FIG. 5, as a result, the holding frame 108 is relatively displaced in the direction orthogonal to the optical axis. In other words, the eccentric rotation of the cylindrical portion A relative to the cylindrical portion B moves the roller seat of the holding frame 108 engaged with the cylindrical portion A in the direction orthogonal to the optical axis.

The position of the roller seat of the holding frame 108 (i.e., the position of the cylindrical portion A in the direction of the optical axis) in the direction of the optical axis is regulated by engaging the peripheral groove 107a of the fourth-group adjustment tube 107 with the second eccentric roller 112. Components in the direction of the optical axis of the eccentric rotation of the cylindrical portion A relative to the cylindrical portion B are absorbed by moving the cylindrical portion B in the guide groove 109a of the fourth-group movement tube 109 by the action illustrated in FIG. 5.

The rotation of the second eccentric rollers 111 in two or more places (more advantageously in three places) enables the fourth-group holding frame 108 to be moved in parallel to any position in the direction orthogonal to the optical axis, allowing the parallel eccentricity of the fourth-group holding frame 108 to be adjusted.

4) Adjustment of Tilt Eccentricity

The rotation of the second eccentric roller 112 rotates the cylindrical portion B in the periphery groove 107a of the fourth-group adjustment tube 107 (the cylindrical portion B revolves around the cylindrical portion A) by the action similar to that illustrated in FIGS. 4 and 5 to displace the fourth-group adjustment tube 107 in the direction of the optical axis. Actually, however, at the time of adjusting tilt eccentricity, the fourth-group adjustment tube 107 is constrained from being displacing in the direction of the optical axis (because the rotation position of the fourth-group adjustment tube 107 is provisionally fixed and the roller 137 is engaged with the lead groove 107b of the fourth-group adjustment tube 107), so that the fourth-group adjustment tube 107 is not displaced in the direction of the optical axis, as a result, the holding frame 108 is relatively displaced in the direction of the optical axis.

In other words, the eccentric rotation of the cylindrical portion A relative to the cylindrical portion B moves the roller seat of the fourth-group holding frame 108 engaged with the cylindrical portion A in the direction of the optical axis. The position of the roller seat of the fourth-group holding frame 108 in the plane orthogonal to the optical axis is regulated by engaging the first eccentric roller 111 with the guide groove 109a of the fourth-group movement tube 109. Components in the plane orthogonal to the optical axis of the eccentric rotation of the cylindrical portion A relative to the cylindrical portion B are absorbed by moving the cylindrical portion B in the peripheral groove 107a of the fourth-group adjustment tube 107 by the action similar to that described in FIG. 5.

The rotation of the second eccentric rollers 112 in two or more places (more advantageously in three places) enables the fourth-group holding frame 108 to be moved at arbitrary tilt angle and to arbitrary tilt direction, allowing the tilt eccentricity of the fourth-group holding frame 108 to be adjusted.

5) Adjustment of Position in the Direction of the Optical Axis

The following describes a work for adjusting the position in the direction of the optical axis of the fourth-group holding frame 108. The rotation of the fourth-group adjustment tube 107 relative to the fourth-group movement tube 109 moves the fourth-group adjustment tube 107 in the direction of the optical axis according to the engagement of the roller 137 screwed to the fourth-group movement tube 109 with the periphery groove 107b (the fourth-group adjustment tube 107) being a movable portion. The movement of the fourth-group adjustment tube 107) to the direction of the optical axis moves the fourth-group holding frame 108 in the direction of the optical axis via the second eccentric roller 112 engaged with the periphery groove 107a of the fourth-group adjustment tube 107.

As described above, the position of the holding frame 108 in the plane orthogonal to the optical axis is regulated by engaging the guide groove 109a of the fourth-group movement tube 109 with the first eccentric roller 111, so that the holding frame 108 is moved in the direction of the optical axis. A hole portion is formed in the movement tube 109 so that the second eccentric roller 112 does not interfere with the movement tube 109.

When the holding frame 108 is displaced in the direction of the optical axis by the rotation of the fourth-group adjustment tube 107, the cylindrical portion B of the second eccentric roller 112 is integrated with the fourth-group adjustment tube 107 and can be moved in the direction of the optical axis with the cylindrical portion B sandwiched between two faces of the periphery groove 107a of the fourth-group adjustment tube 107 which are orthogonal to the optical axis. The cylindrical portion B of the first eccentric roller 111 can be moved in the guide groove 109a of the fourth-group movement tube 109.

The rotation of the fourth-group adjustment tube 107 allows the fourth-group holding frame 108 to be moved to arbitrary position in the direction of the optical axis while maintaining arbitrary position and a position of tilt angle and a tilt direction in the plane orthogonal to the optical axis acquired by the operation of the first and second eccentric rollers 111 and 112.

The following describes an adjustment work performed by the first-group to fourth-group lenses L1 to L4 as a whole. The guide tube 104 is fixed to an adjustment jig (not illustrated) before assembling the mount 101, the stationary tube 102, the outer ring 103, the focus unit 121, the manual ring 122, the main substrate 131, and the components fixed to the above ones among the components described in FIG. 2. In this state, the parallel eccentricity and the tilt eccentricity of the holding frame 108 holding the fourth-group lens L4 with respect to the fourth-group movement tube 109 are adjusted. Thereafter, a position of the holding frame 108 in the direction of the optical axis with respect to the fourth-group movement tube 109 is adjusted and a rotation position of the fourth-group adjustment tube 107 is fixed to the fourth-group movement tube 109 using known means such as screwing or bonding.

The effect of the present exemplary embodiment is described below. According to the present exemplary embodiment, the holding member of an optical element can be subjected to the adjustment of parallel eccentricity using the first eccentric member sandwiched between the faces parallel to the optical axis of the first supporting member and to the adjustment of tilt eccentricity using the second eccentric member sandwiched between the faces orthogonal to the optical axis of the second supporting member. Furthermore, the second eccentric member is moved in the direction of the optical axis along with the second supporting member to allow adjustment of a position of the holding member of the optical element in the direction of the optical axis while keeping the states where the parallel eccentricity and the tilt eccentricity are adjusted.

The rotation of the first and second eccentric members and the movement of the second supporting member are transformed into movement of positions of the parallel eccentricity, the tilt eccentricity, and the direction of the optical axis of the holding member of the optical element. Therefore, it is possible to adjust the amount of movement of positions of the parallel eccentricity, the tilt eccentricity, and the direction of the optical axis of the holding member of the optical element with respect to the amount of rotation and the amount of movement of each member. Thereby, fine adjustment can be more easily performed than that in a case where the holding member of the optical element is directly moved. This allows providing an optical apparatus capable of easily adjusting the positions of the parallel eccentricity, the tilt eccentricity, and the direction of the optical axis and accurately moving minutely small amount.

Figure 3:
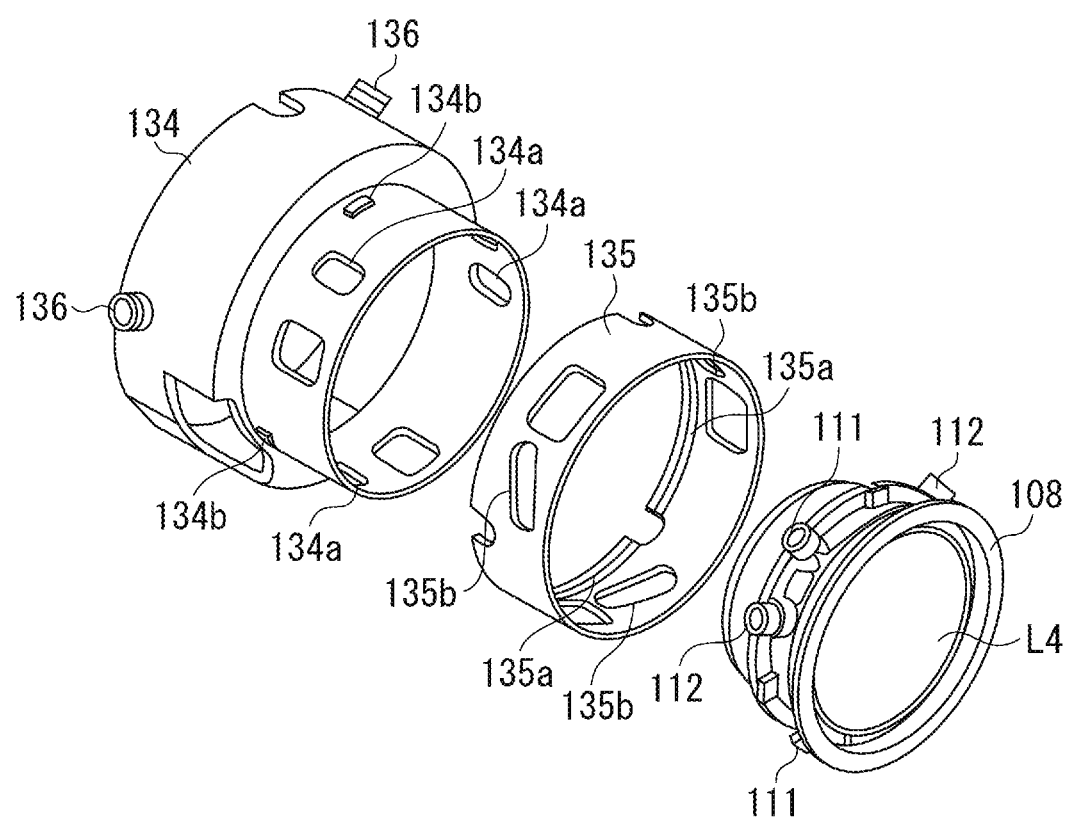
FIG. 3 is an exploded perspective view of a holding portion of an optical element according to a second exemplary embodiment of the present invention.

The interchangeable lens according to a second exemplary embodiment of the present invention is described below with reference to FIG. 3. The same components as those in the first exemplary embodiment illustrated in FIGS. 1 and 2 are given the same reference numerals to omit duplicate description thereof.

The adjustment of the fourth-group is described below.

1) Groove for Adjustment

A guide groove 134a having two faces parallel to the optical axis is provided in three places at a fourth-group movement frame 134 at an equal angle interval with the optical axis as a center. A bayonet groove 135a provided on the inner periphery of a fourth-group adjustment tube 135 is engaged with a bayonet projections 134b (a regulating member) provided in three places on the outer periphery of the fourth-group movement frame 134. The bayonet groove 135a is a substantially endless groove formed in the plane orthogonal to the optical axis. A notch end (FIG. 3) for letting the bayonet projections 134b pass therethrough is provided at a partial area if needed. Thereby, the position in the direction of the optical axis is regulated by the outer periphery of the fourth-group movement frame 134 and the bayonet groove 135a is rotatably engaged therewith. Here, the bayonet projections may be provided on the fourth-group adjustment tube 135 and the bayonet groove may be provided on the fourth-group movement tube.

A lead groove 135b with two faces provided with the amount of lift in the direction of the optical axis is provided in three places at the fourth-group adjustment tube 135 at an equal angle interval with the optical axis as a center.

2) Eccentric Roller

A first eccentric roller 111 and a second eccentric roller 112 which are formed of a comparatively high elastic resin material such as POM are screwed in three places to the fourth-group holding frame 108 for holding the fourth lens group L4 at an equal angle interval with the optical axis as a center. The first and second eccentric rollers 111 and 112 each includes a cylindrical portion A with an axis extending radially in the direction orthogonal to the optical axis as a center with the optical axis as a center and a cylindrical portion B with an axis decentered from the center axis of the cylindrical portion A as a center.

The cylindrical portion A of the first eccentric roller 111 is engaged with a roller seat (not illustrated) of the fourth-group holding frame 108 and the cylindrical portion B thereof is engaged with the guide groove 134a of the fourth-group movement tube 134 in a press-fitted state. The first eccentric roller 111 can be rotated relative to the fourth-group holding frame 108 with the center axis of the cylindrical portion A as a center. Thereby, as described later, the parallel eccentricity of the fourth-group holding frame 108 in the plane orthogonal to the optical axis with respect to the fourth-group movement tube 134 is adjusted by combinations of rotation states of the first eccentric rollers 111 in three places.

The cylindrical portion A of the second eccentric roller 112 is engaged with a roller seat (not illustrated) of the fourth-group holding frame 108 and the cylindrical portion B thereof is engaged with the lead groove 135b of the fourth-group adjustment tube 135 in a press-fitted state. The second eccentric roller 112 can be rotated relative to the fourth-group holding frame 108 with the center axis of the cylindrical portion A as a center. Thereby, as described later, the tilt eccentricity of the fourth-group holding frame 108 toward the fourth-group adjustment tube 135 is adjusted by combinations of rotation states of the second eccentric rollers 112 in three places.

3) Adjustment of Parallel Eccentricity

The following describes a work for adjusting the tilt position and the eccentric position of the fourth-group holding frame 108 by the combination of the first and second eccentric rollers 111 and 112. The rotation position of the fourth-group adjustment tube 135 relative to the fourth-group movement tube 134 is provisionally fixed. In this state, the rotation of the first eccentric roller 111 rotates the cylindrical portion B in the guide groove 134a of the fourth-group movement tube 134 (the cylindrical portion B revolves around the cylindrical portion A) as illustrated in FIG. 4, displacing the movement tube 134 in the direction orthogonal to the optical axis.

Actually, however, at the time of adjusting parallel eccentricity, the movement tube 134 is constrained from being displacing in the direction orthogonal to the optical axis (because the roller 136 is constrained at the intersection between the guide groove of the guide tube 104 in the direction of the optical axis and the cam groove of the first cam tube 105), so that the movement tube 134 is not displaced in the direction orthogonal to the optical axis. As illustrated in the right side of FIG. 5, as a result, the holding frame 108 is relatively displaced in the direction orthogonal to the optical axis. In other words, the eccentric rotation of the cylindrical portion A relative to the cylindrical portion B moves the roller seat of the holding frame 108 engaged with the cylindrical portion A in the direction orthogonal to the optical axis.

The position of the roller seat of the holding frame 108 (i.e., the position of the cylindrical portion A in the direction of the optical axis) in the direction of the optical axis is regulated by engaging the lead groove 135b of the fourth-group adjustment tube 135 with the second eccentric roller 112. Components in the direction of the optical axis of the eccentric rotation of the cylindrical portion A relative to the cylindrical portion B are absorbed by moving the cylindrical portion B in the guide groove 134a of the fourth-group movement tube 134 by the action illustrated in FIG. 5.

The rotation of the second eccentric rollers 111 in two or more places (more advantageously in three places) enables the fourth-group holding frame 108 to be moved in parallel to arbitrary position in the direction orthogonal to the optical axis, allowing the parallel eccentricity of the fourth-group holding frame 108 to be adjusted.

4) Adjustment of Tilt Eccentricity

The rotation of the second eccentric roller 112 rotates the cylindrical portion B in the lead groove 135b of the fourth-group adjustment tube 135 (the cylindrical portion B revolves around the cylindrical portion A) by the action similar to that illustrated in FIGS. 4 and 5 to displace the fourth-group adjustment tube 135 in the direction of the optical axis. Actually, however, at the time of adjusting tilt eccentricity, the fourth-group adjustment tube 135 is constrained from being displacing in the direction of the optical axis (because the rotation position of the fourth-group adjustment tube 135 is provisionally fixed and the bayonet 135a is engaged with the bayonet projection 134b), so that the fourth-group adjustment tube 137 is not displaced in the direction of the optical axis, as a result, the holding frame 108 is relatively displaced in the direction of the optical axis.

In other words, the eccentric rotation of the cylindrical portion A relative to the cylindrical portion B moves the roller seat of the fourth-group holding frame 108 engaged with the cylindrical portion A in the direction of the optical axis. The position of the roller seat of the holding frame 108 in the plane orthogonal to the optical axis is regulated by engaging the second eccentric roller 111 with the guide groove 134a of the fourth-group movement tube 134. Components in the plane orthogonal to the optical axis of the eccentric rotation of the cylindrical portion A relative to the cylindrical portion B are absorbed by moving the cylindrical portion B in the lead groove 135b of the fourth-group adjustment tube 135 by the action similar to that described in FIG. 5.

The rotation of the second eccentric rollers 112 in two or more places (more advantageously in three places) enables the fourth-group holding frame 108 to be moved at tilt angle and to arbitrary tilt direction, allowing the tilt eccentricity of the fourth-group holding frame 108 to be adjusted.

5) Adjustment of Position in the Direction of the Optical Axis

The following describes a work for adjusting the position in the direction of the optical axis of the fourth-group holding frame 108. The rotation of the fourth-group adjustment tube 135 relative to the fourth-group movement tube 134 changes the position of the lead groove 135b of the fourth-group adjustment tube 135 to move the fourth-group holding frame 108 via the engaged second eccentric roller 112.

As described above, the position of the holding frame 108 in the plane orthogonal to the optical axis is regulated by engaging the guide groove 134a of the fourth-group movement tube 134 with the first eccentric roller 111, so that the holding frame 108 is moved in the direction of the optical axis. A hole portion is formed in the movement tube 134 so that the second eccentric roller 112 does not interfere with the movement tube 134.

When the holding frame 108 is displaced in the direction of the optical axis by the rotation of the fourth-group adjustment tube 135, the cylindrical portion B of the second eccentric roller 112 can be moved in the direction of the optical axis with the cylindrical portion B sandwiched between two faces of the lead groove 135b provided with the amount of lift in the direction of the optical axis. The cylindrical portion B of the first eccentric roller 111 can be moved in the guide groove 134a of the fourth-group movement tube 134.

The rotation of the fourth-group adjustment tube 135 allows the fourth-group holding frame 108 to be moved to arbitrary position in the direction of the optical axis while maintaining arbitrary position and a position of tilt angle and tilt direction in the plane orthogonal to the optical axis acquired by the operation of the first and second eccentric rollers 111 and 112.

The following describes an adjustment work performed by the first-group to fourth-group lenses L1 to L4 as a whole. The guide tube 104 is fixed to an adjustment jig (not illustrated) before assembling the mount 101, the stationary tube 102, the outer ring 103, the focus unit 121, the manual ring 122, the main substrate 131, and the components fixed to the above ones among the components described in FIG. 2. In this state, the position of tilt and eccentricity of the holding frame 108 holding the fourth-group lens L4 with respect to the fourth-group movement tube 134 are adjusted.

Thereafter, a position of the holding frame 108 in the direction of the optical axis with respect to the fourth-group movement tube 134 is adjusted and a rotation position of the fourth-group adjustment tube 135 is fixed to the fourth-group movement tube 134 using known means such as screwing or bonding.

The effect of the present exemplary embodiment is described below. According to the present exemplary embodiment, the holding member of an optical element can be subjected to the adjustment of eccentric position using the first eccentric member sandwiched between two faces parallel to the optical axis of the first supporting member and to the adjustment of tilt position using the second eccentric member sandwiched between the two faces of the second supporting member provided with the amount of lift in the direction of the optical axis. Furthermore, the second eccentric member is moved in the direction of the optical axis by changing the position of lift face of the second supporting member to allow adjustment of a position of the holding member of the optical element in the direction of the optical axis while keeping the states where the parallel eccentricity and the tilt eccentricity are adjusted.

The rotation of the first and second eccentric members and the movement of the second supporting member are transformed into movement of positions of the parallel eccentricity, the tilt eccentricity, and the direction of the optical axis of the holding member of the optical element. Therefore, it is possible to adjust the amount of movement of positions of the parallel eccentricity, the tilt eccentricity, and the direction of the optical axis of the holding member of the optical element with respect to the amount of rotation and the amount of movement of each member. Thereby, fine adjustment can be more easily performed than that in a case where the holding member of the optical element is directly moved. This allows providing an optical apparatus capable of easily adjusting the positions of the parallel eccentricity, the tilt eccentricity, and the direction of the optical axis and accurately moving minutely small amount.

A modification of the present invention is described below. In the above, the preferable exemplary embodiments of the present invention are described. The present invention is not limited to the exemplary embodiments, but various modifications and changes may be made within the gist of the present invention. For example, the first and second eccentric members do not always need be provided in three places. If the first and second eccentric members are provided in at least one place (non-eccentric members may be provided in other places), it is possible to perform adjustment to arbitrary position in at least one direction. If the eccentric members are provided in two places (non-eccentric members may be provided in other places), it is possible to perform adjustment to arbitrary position in arbitrary direction. According to the exemplary embodiments, a slot-shaped groove portion is used for the groove with which each roller is engaged, however, an endless groove may be used instead of the slot-shaped groove portion.

Although the lead groove 107b is provided in the adjustment tube being the second supporting member as one of the first and second supporting members and the roller member engaged with the lead groove is provided on the movement tube being the other supporting member (the first supporting member), this may be reversed. The position adjustment in the direction of the optical axis is performed via the lead groove with the amount of lift, however, the position adjustment in the direction of the optical axis may be performed via the straight-line groove and the cam groove such that the second supporting member is caused to advance straight toward the optical axis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-086170 filed Apr. 8, 2011, which is hereby incorporated by reference herein in its entirety.

What is claimed is:

1. An optical apparatus comprising:
a first supporting member including a first groove portion extending in a direction of an optical axis;
a second supporting member including a second groove portion extending in a direction inclined toward the direction of the optical axis and a third groove portion extending in a direction orthogonal to the optical axis;
a holding member configured to hold an optical element;
a first eccentric member having one end being rotatably attached to the holding member with a rotational axis in the direction orthogonal to the optical axis as a center and another end being decentered with respect to the rotational axis and engaged with the first groove portion;
a second eccentric member having one end being rotatably attached to the holding member with a rotational axis in the direction orthogonal to the optical axis as a center and another end being decentered with respect to the rotational axis and engaged with the third groove portion; and
an engaging member provided on the first supporting member and engaged with the second groove portion;
wherein the first eccentric member is rotated with the rotational axis as a center so the optical element moves in the direction orthogonal to the optical axis relative to the first supporting member,
wherein the second eccentric member is rotated with the rotational axis as a center so the optical element tilts with respect to the plane orthogonal to the optical axis, and
wherein a position where the engaging member is engaged with the second groove portion is changed so the second supporting member and the holding member can advance or retreat in the direction of the optical axis relative to the first supporting member.

2. The optical apparatus according to claim 1, wherein the second supporting member is a tubular member, and wherein the second and third groove portions extend in a peripheral direction of the second supporting member.

3. The optical apparatus according to claim 1, wherein the first and second eccentric members are eccentric rollers.

4. The optical apparatus according to claim 1, wherein three first and second eccentric members are respectively provided on the outer periphery of the holding member.

5. An optical apparatus comprising:
a first supporting member including a first groove portion extending in a direction of an optical axis;
a second supporting member including a second groove portion extending in a direction inclined toward the direction of the optical axis;
a holding member configured to hold an optical element;
a first eccentric member having one end being rotatably attached to the holding member with a rotational axis in the direction orthogonal to the optical axis as a center and another end being decentered with respect to the rotational axis and engaged with the first groove portion;
a second eccentric member having one end being rotatably attached to the holding member with a rotational axis in the direction orthogonal to the optical axis as a center and another end being decentered with respect to the rotational axis and engaged with the second groove portion;
a fourth groove provided on one of the first supporting member or the second supporting member and extending in a circumferential direction, which is orthogonal to the optical axis; and
a regulating member provided on the other one of the first supporting member or the second supporting member and engaging with the fourth groove to regulate the movement of the second supporting member to the direction of the optical axis relative to the first supporting member, the second supporting member being rotatable around the optical axis relative to the first supporting member;
wherein the first eccentric member is rotated with the rotational axis as a center so the optical element moves in the direction orthogonal to the optical axis relative to the first supporting member,
wherein the second eccentric member is rotated with the rotational axis as a center so the optical element tilts with respect to the plane orthogonal to the optical axis, and
wherein a position where the second eccentric member is engaged with the second groove portion is changed so the holding member can advance or retreat in the direction of the optical axis relative to the first supporting member.

6. The optical apparatus according to claim 5, wherein the second supporting member is a tubular member, and wherein the second groove portion extends in a peripheral direction of the second supporting member.

7. The optical apparatus according to claim 5, wherein the first and second eccentric members are eccentric rollers.

8. The optical apparatus according to claim 5, wherein three first and second eccentric members are respectively provided on the outer periphery of the holding member.

9. An optical apparatus comprising:
a first cylindrical member including a guide groove extending in a direction of an optical axis on an outer circumference portion of the first cylindrical member;
a second cylindrical member rotatable around the optical axis with respect to the first cylindrical member and including a peripheral groove extending in a circumferential direction orthogonal to the optical axis and a lead groove extending obliquely in a circumferential direction orthogonal to the optical axis on the outer circumference portion of the second cylindrical member;
a holding member configured to hold an optical element;
a first eccentric roller having one end rotatably attached to the holding member with a rotational axis orthogonal to the optical axis as a center and another end being decentered from the rotational axis and engaged with the guide groove;
a second eccentric roller having one end being rotatably attached to the holding member having a rotational axis orthogonal to the optical axis as a center and another end being decentered from the rotational axis and engaged with the peripheral groove; and
a roller provided on the first cylindrical member and engaged with the lead groove.

10. The optical apparatus according to claim 9, wherein the first eccentric roller is rotated with the rotational axis as a center so the holding member moves in the direction orthogonal to the optical axis and relative to the first cylindrical member, wherein the second eccentric roller is rotated with the rotational axis as a center so the holding member tilts with respect to the plane orthogonal to the optical axis, and wherein a position where the roller is engaged with the lead groove is changed so the second cylindrical member and the holding member can advance or retreat in the direction of the optical axis relative to the first cylindrical member while maintaining the direction orthogonal to the optical axis and tilts with respect to the plane orthogonal to the optical axis of the holding member.

11. An optical apparatus comprising:
a first cylindrical member including a guide groove extending in a direction of an optical axis on outer circumference portion of the first cylindrical member;
a second cylindrical member rotatable around the optical axis with respect to the first cylindrical member and including a lead groove extending obliquely in a circumferential direction orthogonal to the optical axis on an outer circumference of the second supporting member;
a holding member configured to hold an optical element;
a first eccentric roller having one end rotatably attached to the holding member with a rotational axis orthogonal to the optical axis as a center and another end decentered from the rotational axis and engaged with the guide groove;
a second eccentric roller having one end rotatably attached to the holding member with a rotational axis orthogonal to the optical axis as a center and another end decentered from the rotational axis and engaged with the lead groove;
a regulating groove provided on one of the first cylindrical member or the second cylindrical member and extending in a circumferential direction orthogonal to the optical axis; and
a regulating member provided on the other one of the first cylindrical member or the second cylindrical member and engaging with the regulating groove to regulate a movement of the second cylindrical member in the direction of the optical axis relative to the first cylindrical member, the second supporting member being rotatable around the optical axis relative to the first supporting member.

12. The optical apparatus according to claim 11, wherein the first eccentric roller is rotated with the rotational axis as a center so the optical element moves in the direction orthogonal to the optical axis relative to the first cylindrical member, wherein the second eccentric roller is rotated with the rotational axis as a center so the optical element tilts with respect to the plane orthogonal to the optical axis, and wherein the position where the second eccentric roller is engaged with the lead groove portion is changed so the holding member can advance or retreat in the direction of the optical axis relative to the first cylindrical member.

* * * * *